United States Patent [19]

Ochab et al.

[11] Patent Number: 5,971,123

[45] Date of Patent: Oct. 26, 1999

[54] BI-DIRECTIONAL OVERRUNNING CLUTCH

[75] Inventors: David C. Ochab, Horseheads; John R. Updyke, Elmira, both of N.Y.

[73] Assignee: Hilliard Corporation, Elmira, N.Y.

[21] Appl. No.: 09/169,847

[22] Filed: Oct. 9, 1998

[51] Int. Cl.$^6$ .................................................. F16D 27/12
[52] U.S. Cl. ........................... 192/48.2; 74/650; 192/38; 192/40; 192/50; 192/84.21
[58] Field of Search ................ 192/48.2, 49, 50, 192/51, 38, 40, 84.2, 84.21; 74/650

[56] References Cited

U.S. PATENT DOCUMENTS

| | | | |
|---|---|---|---|
| 1,823,389 | 9/1931 | Lavaud . | |
| 2,865,228 | 12/1958 | Weismann | 74/650 |
| 3,124,972 | 3/1964 | Seliger et al. | 74/650 |
| 3,262,526 | 7/1966 | Kramer | 192/38 |
| 3,447,396 | 6/1969 | Selinger | 74/650 |
| 3,581,597 | 6/1971 | Reiersgaard | 74/650 |
| 3,700,082 | 10/1972 | Schwab | 192/50 |
| 3,935,753 | 2/1976 | Williams | 74/650 |
| 4,373,407 | 2/1983 | Okubo | 74/650 |
| 4,434,878 | 3/1984 | Okubo | 192/48.92 |
| 4,681,180 | 7/1987 | Oyama et al. | 180/76 |
| 4,782,720 | 11/1988 | Teraoka et al. | 74/650 |
| 4,787,491 | 11/1988 | Kato | 192/48.6 |
| 4,940,123 | 7/1990 | Sayama | 192/58.41 |
| 5,025,902 | 6/1991 | Imai et al. | 192/43 |
| 5,036,939 | 8/1991 | Johnson et al. | 180/233 |
| 5,348,126 | 9/1994 | Gao | 192/7 |
| 5,845,546 | 12/1998 | Knowles et al. | 192/650 |

*Primary Examiner*—Charles A Marmor
*Assistant Examiner*—Saul Rodriguez
*Attorney, Agent, or Firm*—Seidel, Gonda, Lavorgna & Monaco, PC

[57] ABSTRACT

A bi-directional overrunning clutch is disclosed for controlling torque transmission between a secondary drive shaft and secondary driven shafts. The overrunning clutch includes a pinion input shaft in a differential housing that engages with a clutch housing rotatably disposed within the differential housing. At least one race is located adjacent to the clutch housing and is engaged with an output shaft. A cage is located between the race and the clutch housing. The cage is movable with respect to the clutch housing. A first coil is mounted within the differential housing adjacent to the cage and is adapted to produce an electromagnetic field when energized which causes the cage to drag with respect to the clutch housing. The dragging of the cage with respect to the clutch housing positions the cage to engage the clutch housing with the race when wheels on a primary drive shaft lose traction. A second coil is mounted within the differential housing adjacent adjacent to the cage. The second coil is adapted to produce an electromagnetic field when energized which advances cage with respect to the clutch housing causing the clutch housing to engage with the races. When the second coil is activated, the output shaft drives the pinion input shaft producing engine braking. An electronic control system is utilized to control the energizing of the coils.

26 Claims, 8 Drawing Sheets

FORWARD

FORWARD

FORWARD

FORWARD

BI-DIRECTIONAL OVERRUNNING CLUTCH

FIELD OF THE INVENTION

The present invention relates to clutches and, more particularly, to a bi-directional electromechanical overrunning clutch for providing four wheel drive capability.

BACKGROUND OF THE INVENTION

The increased demand in recent years for off-road and all terrain vehicles has led to tremendous developments in those types of vehicles. Many of the developments have centered around making the vehicle more adaptable to changing road conditions, e.g., dirt roads, pavement and gravel. As the road terrain changes, it is desirable to vary the driving capabilities of the vehicle to more efficiently navigate the new terrain. Prior four-wheel drive and all terrain vehicles were cumbersome since they required the operator to manually engage and disengage the secondary drive shaft, e.g., by stopping the vehicle to physically lock/unlock the wheel hubs. Improvements in vehicle drive trains, such as the development of automated systems for engaging and disengaging a driven axle, eliminated many of the problems of the prior designs. These automated drive systems are sometimes referred to as "on-the-fly" four wheel drive. These systems, however, require the vehicle to be in either 2-wheel or 4-wheel drive at all times.

Generally, all four-wheel drive vehicles include a differential for transferring torque from a drive shaft to the driven shafts that are attached to the wheels. Typically, the driven shafts (or half shafts) are independent of one another allowing differential action to occur when one wheel attempts to rotate at a different speed than the other, for example when the vehicle turns. The differential action also eliminates tire scrubbing, reduces transmission loads and reduces understeering during cornering (the tendency to go straight in a corner). There are four main types of conventional differentials: open, limited slip, locking, and center differentials. An open differential allows differential action between the half shafts but, when one wheel loses traction, all available torque is transferred to the wheel without traction resulting in the vehicle stopping.

A limited slip differential overcomes the problems with the open differential by transferring all torque to the wheel that is not slipping. Some of the more expensive limited slip differentials use sensors and hydraulic pressure to actuate the clutch packs locking the two half shafts together. The benefits of these hydraulic (or viscous) units are often overshadowed by their cost, since they require expensive fluids and complex pumping systems. The heat generated in these systems, especially when used for prolonged periods of time may also require the addition of an auxiliary fluid cooling source.

The third type of differential is a locking differential that uses clutches to lock the two half shafts together or incorporates a mechanical link connecting the two shafts. In these types of differentials, both wheels can transmit torque regardless of traction. The primary drawback to these types of differentials is that the two half shafts are no longer independent of each other. As such, the half shafts are either locked or unlocked to one another. This can result in problems during turning where the outside wheel tries to rotate faster than the inside wheel. Since the half shafts are locked together, one wheel must scrub. Another problem that occurs in locking differentials is twichiness when cornering due to the inability of the two shafts to turn at different speeds.

The final type of differential is a center differential. These types of differentials are used in the transfer case of a four wheel drive vehicle to develop a torque split between the front and rear drive shafts.

Many differentials on the market today use some form of an overrunning clutch to transmit torque when needed to a driven shaft. One successful use of an overrunning clutch in an all terrain vehicle is disclosed in U.S. Pat. No. 5,036,939. In that patent, the vehicle incorporates overrunning clutches directly into the wheel hubs, thus allowing each wheel to independently disengage when required.

SUMMARY OF THE INVENTION

A bi-directional overrunning clutch is disclosed for controlling torque transmission between a secondary drive shaft and secondary driven shafts. The present invention, when used in a vehicle, provides four wheel drive capability in the event of traction loss on any primary drive shaft.

The overrunning clutch includes a differential housing with a pinion input shaft extending outwardly from the housing. One end of the pinion input shaft is engaged with the secondary drive shaft. The other end of the input shaft is located within the differential housing and includes an input gear. The input gear preferably engages with a ring gear rotatably disposed within the housing such that rotation of the input gear produces concomitant rotation of the ring gear.

A clutch housing is attached to the ring gear and includes an inner cam surface. At least one and preferably two races are located adjacent to the cam surface. Each race is engaged with an output shaft. The output shaft, in turn, is engaged with a secondary driven half shaft.

A roll cage is located between the race and the cam surface. The roll cage has a plurality of slots which are preferably spaced equidistantly about its circumference. Each slot has a roll located therein. The roll cage is movable with respect to the clutch housing and the races.

A first armature plate is located adjacent to and engaged with the roll cage so that the first armature plate rotates in conjunction with the roll cage. A first coil is mounted within the differential housing adjacent the first armature plate. The first coil is adapted to produce an electromagnetic field when energized which hinders the rotation of the first armature plate, thus causing the roll cage to drag with respect to the clutch housing. The dragging of the roll cage with respect to the clutch housing causes the rolls to engage the clutch housing and the race when the wheels on the primary drive shaft lose traction. When traction loss occurs, the rolls become wedged between the clutch housing and the races so as to provide driving engagement therebetween.

A second armature plate is located adjacent the roll cage. A second coil is mounted within the differential housing adjacent to the second armature plate. The second coil is adapted to produce an electromagnetic field when energized to hinder the rotation of the second armature plate. This causes the roll cage to advance with respect to the clutch housing causing the clutch housing to engage with the races. In this mode of operation, the secondary driven half shafts and output shaft drive the pinion input shaft and secondary drive shaft, thereby producing engine braking.

In another embodiment, a third armature plate is located adjacent to the roll cage and a third coil is mounted within the differential housing adjacent to the third armature plate. The third coil produces an electromagnetic field when energized which hinders the rotation of the third armature plate. This causes the roll cage to move opposite the direction of rotation of the clutch housing to assist in disengaging the rolls from between the clutch housing and the races.

The clutch housing preferably has a plurality of toggle levers pivotally attached thereto that engage with pins mounted on the roll cage. The engagement between the toggle levers and the pins permits the roll cage to be advanced and retarded with respect to the clutch housing. The second armature plate engages with the toggle lever to advance the cage and the third armature plate engages with the toggle lever to retard the cage.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DESCRIPTION OF THE EMBODIMENTS

Figure 1:
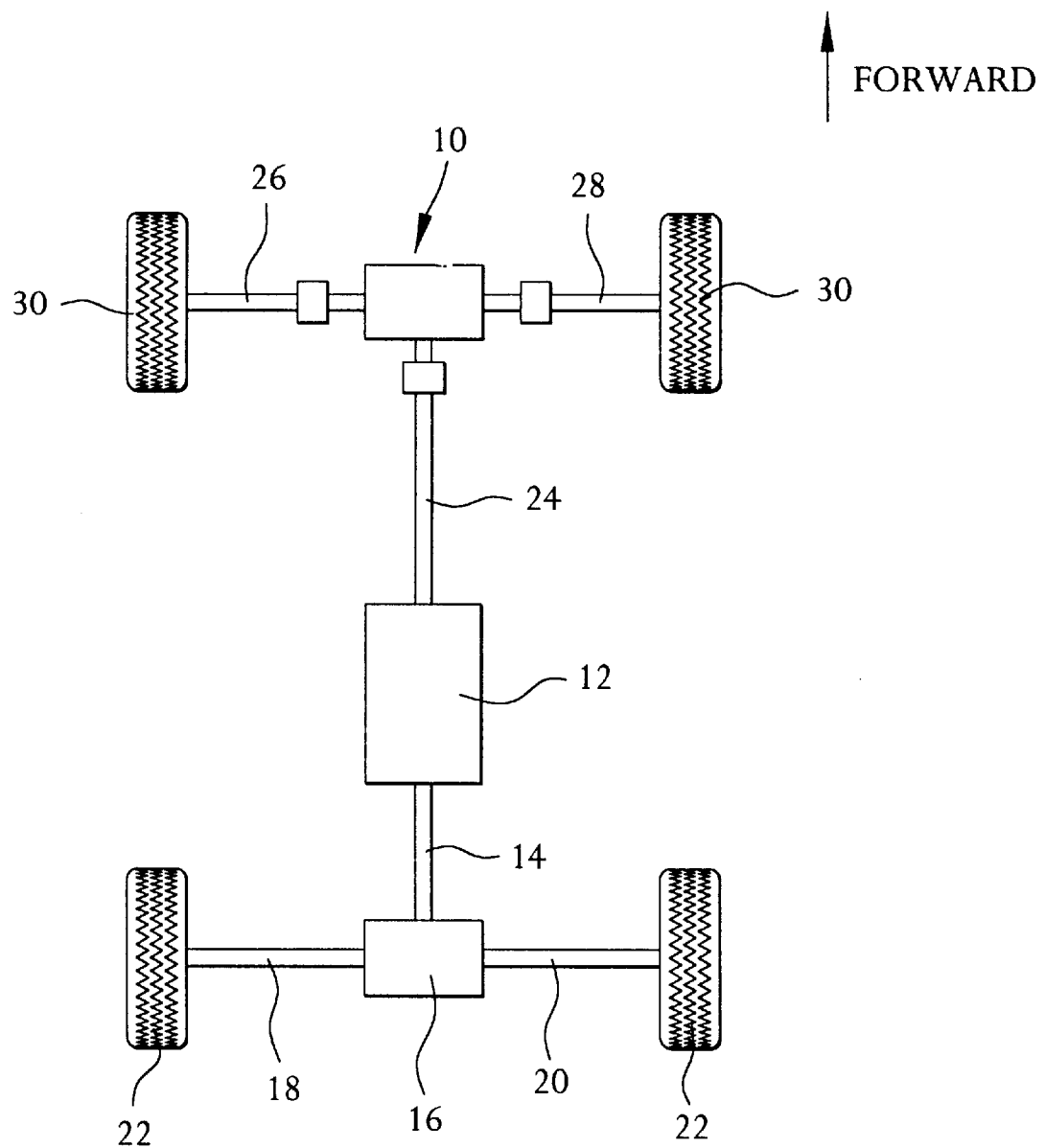
FIG. 1 is a schematic representation of one drive train embodiment in a vehicle incorporating the present invention.

Referring now to the drawings, wherein like reference numerals illustrate corresponding or similar elements throughout the several views, FIG. 1 is a schematic representation of one embodiment of a drive system incorporating a bidirectional overrunning clutch 10 according to the present invention. The drive system includes a transmission 12, a primary drive shaft 14 a primary differential 16, and first and second primary driven shafts 18, 20 which drive primary wheels 22.

The drive system also includes a secondary drive shaft 24 which is rotatably connected to the bidirectional overrunning clutch 10 through any conventional means known to those skilled in the art, such as a splined connection. The overrunning clutch 10, in turn, rotatably drives two secondary driven shafts 26, 28 which are attached to wheels 30.

Figure 2:
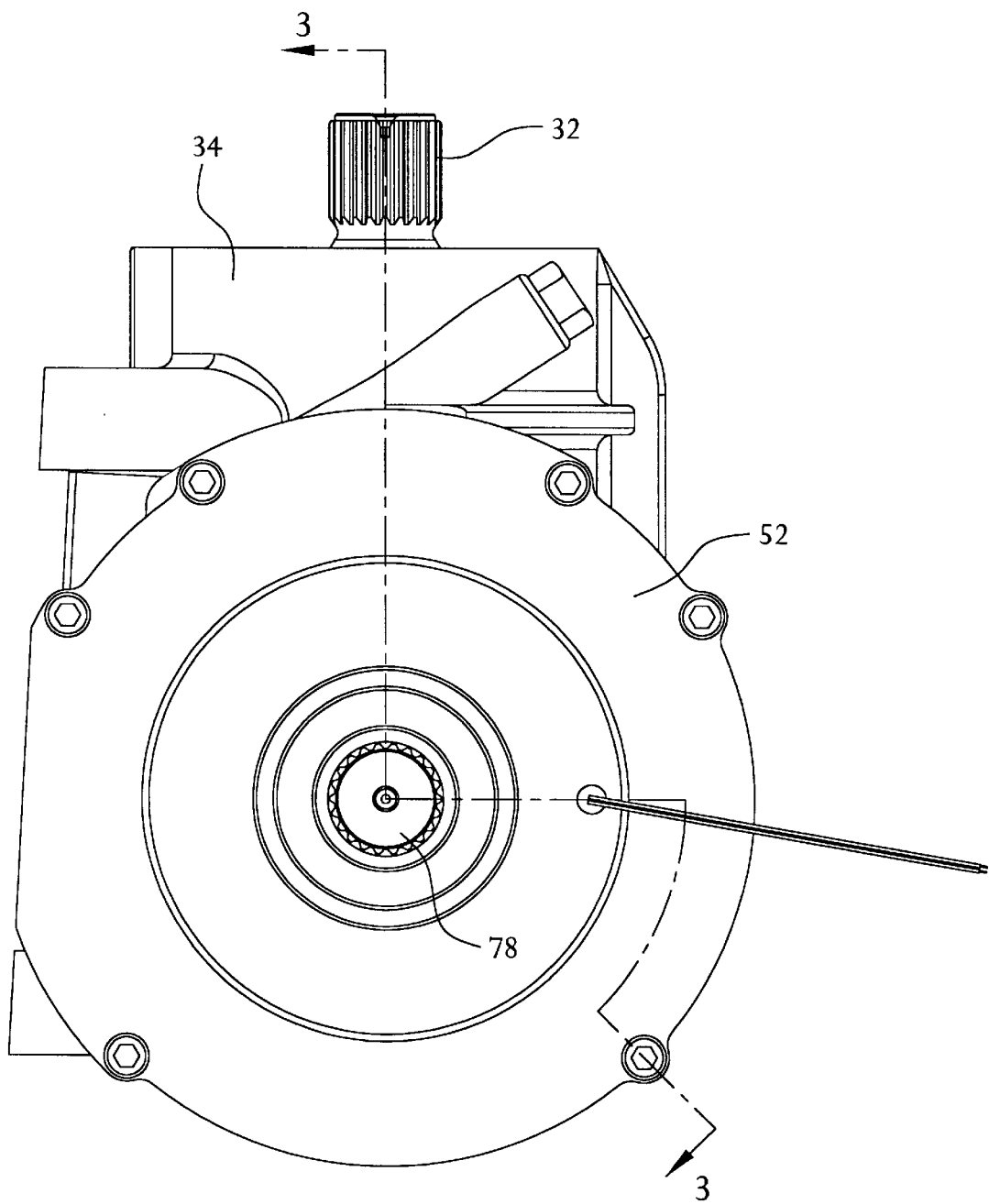
FIG. 2 is a right side view of one embodiment of the bi-directional overrunning clutch according to the present invention.
Figure 3:
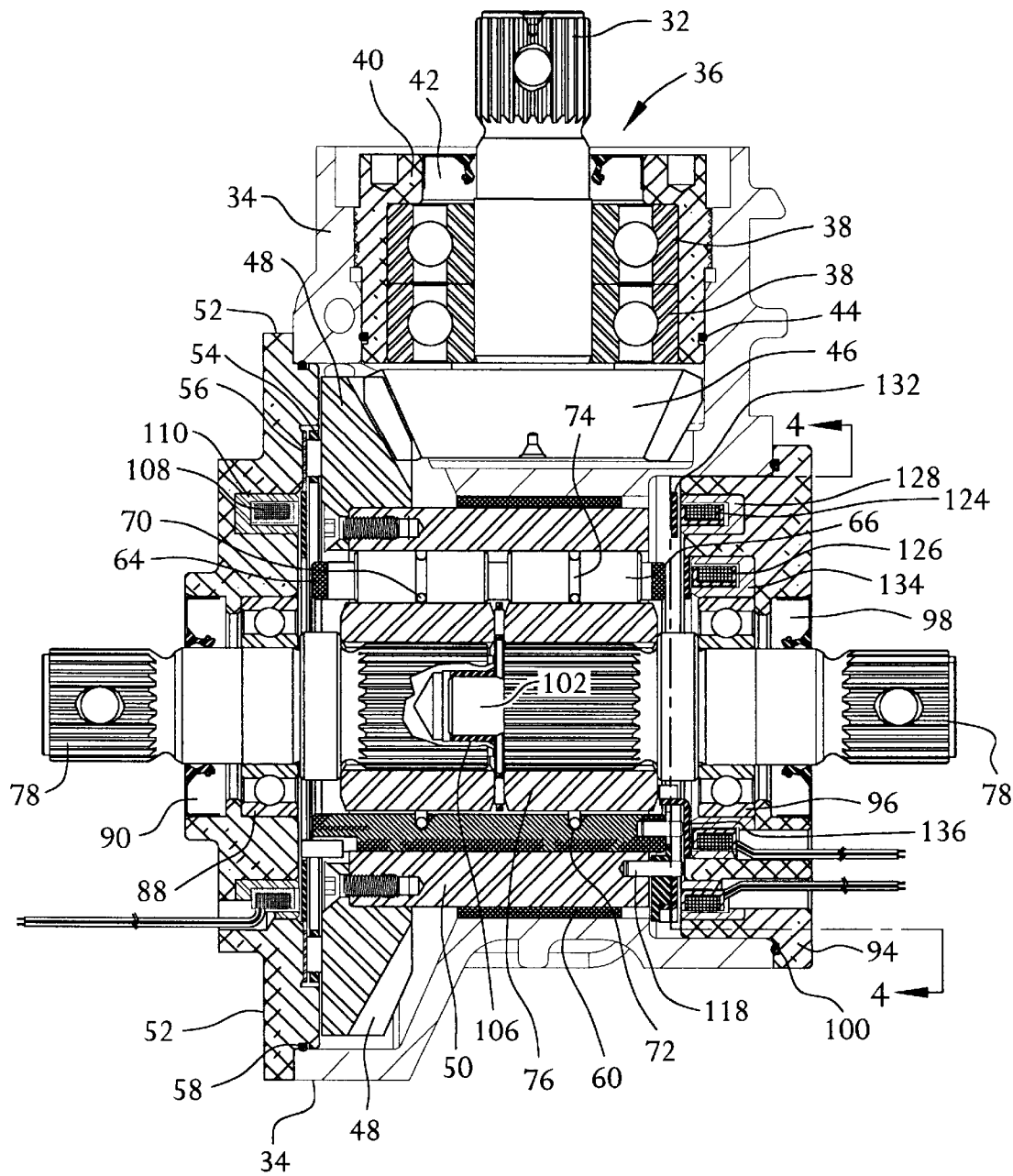
FIG. 3 is cross-sectional view of the bidirectional overrunning clutch taken along lines 3—3 in FIG. 2.

The details of the bi-directional overrunning clutch will now be described with respect to FIGS. 2 through 5. FIG. 2 illustrates the right cover 52 of the bi-directional overrunning clutch 10. The secondary drive shaft 24 engages with a splined end of a pinion input shaft 32. The pinion input shaft 32 extends out from and is rotatable with respect to a differential housing 34. More specifically, the pinion input shaft 32 is located within a bearing assembly 36 that includes two roller bearings 38 within a bearing support 40. The pinion input shaft 32 is positioned against the inner race of the two roller bearings 38. The outer races of the bearings 38 lie against the bearing support 40. An oil seal 42 is also located between the bearing support 40 and the pinion input shaft 32. The oil seal 42 prevents oil from escaping out of the bearing assembly 36. The bearing assembly 36 is mounted within the differential housing 34 by any conventional means. A rubber O-ring 44 is located between the bearing assembly 36 and the differential housing 24 to provide a fluid tight seal.

The pinion input shaft 32 preferably has a bevel gear 46 formed on or attached to the end of the shaft 32 located within the differential housing 34. The bevel gear is preferably made from steel material with spiral bevels. The bevel gear 46 engages with a ring gear 48 located within the differential housing 34. The ring gear 48 is preferably made from steel with spiral bevels. In one embodiment of the invention, the ring gear 48 and bevel gear 46 both have mating 35° spiral bevels. Those skilled in the art would appreciate that other angles can be used in the present invention depending on the design of the entire clutch system and the anticipated loading. Furthermore, it is contemplated that other gearing arrangements, such as a worm gear set, may be used for engaging the pinion input shaft 32 to the differential housing 34.

The ring gear 48 is preferably bolted to a clutch housing 50 which will be described in more detail hereinafter. A right cover plate 52 is located adjacent to the ring gear 48 and attached to the differential housing 34 though any conventional means, such as bolts. A thrust bearing 54 and thrust washer 56 are located between the right cover plate 52 and the ring gear 48. The thrust bearing 54 is in rolling contact with the ring gear 48 and, in one embodiment, is a NTA-6074 Torrington thrust bearing, sold by Torrington Co., Torrington, Conn. The thrust washer 56 is located between the thrust bearing 54 and the right cover plate 52 and is preferably made from steel. One suitable thrust washer is a TRB-6074 Torrington thrust washer sold by Torrington Co. The thrust bearing 54 and washer 56 combination allow the ring gear 48 to freely rotate within differential housing 34. A rubber O-ring 58 is preferably positioned between the right cover plate and the differential housing 34 to provide a fluid tight seal.

A bushing 60 is mounted between the clutch housing 50 and the differential housing 34, permitting the clutch housing 50 to freely rotate within the differential housing 34. The bushing 60 is preferably a self-lubricating bushing made from composite material. One suitable type of bushing is an MB 8540DU DU bearing sold by Garlock Bearing Inc., Thorofare, N.J. The clutch housing 50 is preferably made from steel material and has an inner cam surface which is discussed in more detail below. A roller assembly 62 is located within the clutch housing 50 and includes a roll cage 64 which contains a plurality of rolls 66. The roll cage 64 preferably includes two independent sets of rolls 66 disposed within slots 68 formed in the roll cage 64 around its circumference. In the illustrated embodiment there are six rolls in each set of rolls. The roll cage 64 is preferably made from hard anodized aluminum material. Alternatively, the roll cage 64 can be made from plastic or composite material. The rolls are preferably made from hardened steel material. A wire spring 70 retains the rolls 66 within the slots 68 of the roll cage 64. The wire spring 70 is disposed within a groove 72 formed on the inner surface of the roll cage 64 and within depressions 74 formed in the rolls 66.

Each set of rolls 66 is located adjacent to the inner cam surface of the clutch housing 50. The contour of the cam surface is shown in more detail in FIGS. 6A through 6D and is configured with a plurality of peaks and valleys. When the roll cage 64 is located within the clutch housing 50, the rolls 66 are located within the valleys with the cam surface tapering toward the race on either side of the roll 66 (generally referred to herein as tapered portions 50$_T$). The cam surface and rolls 66 provide the bi-directional overrunning capabilities as will be discussed hereinafter. Cam surfaces and roll cages in overrunning clutches are well known in the art. See, e.g., U.S. Pat. No. 4,373,407, which is incorporated herein by reference in its entirety. Hence, a detailed discussion of these features is not needed.

At least one and preferably two races 76 are rotatably located in the center of the roll cage 64. Each race 76 is adjacent one of the sets of rolls 66 such that the outer surface of the race 76 contacts the set of rolls 66. As will become evident hereinafter, the contact between the rolls 66, the clutch housing 50 and the races 76 causes the races 76 to rotate with the clutch housing 50. The races 76 are preferably made from steel material. A thrust bearing 77 is disposed between the two races 76 to allow the races 76 to freely rotate with respect to one another. The thrust bearing 77 is preferably an NTA-1828 Torrington thrust bearing sold by Torrington Co.

Each race 76 is engaged with a corresponding output shaft 78 through any conventional means designed to transfer torque from the race 76 to the output shaft 78. In the illustrated embodiment, each race 76 includes internal splines 80 which mate with external splines 82 formed on a portion of the output shaft 78. The splined arrangement illustrated permits the output shaft 78 to be removed by sliding it axially out of the race 76. A shoulder 84 formed on the output shaft 78 limits the axial translation of the output shaft 78 into the race 76. The output shaft is preferably made from steel material. It is contemplated that the race 76 and output shaft 78 can be formed as an integral unit if desired. One of the output shafts 78 (i.e., the right output shaft) extends out of an opening 86 formed in the right cover plate 52. A roller bearing 88 surrounds a portion of the output shaft 78 and engages with the right cover plate 52. The roller bearing 88 supports the output shaft 78 while permitting the output shaft 78 to rotate with respect to the right cover plate 52. An oil seal 90 is preferably incorporated into the right cover plate 52 around the output shaft 78 to provide a fluid tight seal between the two components.

Similarly, the other output shaft 78 (i.e., the left output shaft) extends out of an opening 92 formed in a left cover plate 94. A roller bearing 96 surrounds a portion of the output shaft 78 and engages with the left cover plate 94. An oil seal 98 is preferably incorporated into the left cover plate 94 around the output shaft 78 to provide a fluid tight seal. The left cover plate 94 is attached to the differential housing 34 by any conventional means, such as bolts. A rubber O-ring 100 is preferably inserted between the left cover plate 94 and the differential housing 34.

To assist in aligning the two output shafts 78, one of the output shafts 78 preferably includes a raised protrusion 102 which mates with a recess 104 formed in the other output shaft 78. A bushing 106 can be placed on the protrusion 102 or in the recess 104 to facilitate relative motion between the two shafts.

The output shafts 78 extend outward from the differential housing 34 and connect to secondary half shafts which drive the vehicle's wheels 30. Each output shaft 78 is connected to a secondary half shaft through any conventional means known to those skilled in the art, such as a splined connection. (For the sake of simplicity, the output shafts 78 and two half shafts are collectively referred to herein as the secondary driven shafts 26, 28.)

As discussed briefly above, the engagement of the rolls 66 with the clutch housing 50 and races 76 permits the transfer of torque from the secondary drive shaft 24 to the secondary driven shafts 26, 28. In order to activate the overrunning clutch, the present invention incorporates an electromagnetic system. More specifically, the present invention includes two and more preferably three roll cage adjustment devices which are electrically connected to an electronic control system. In one preferred embodiment, the roll cage adjustment devices include a plurality of coils and armature plates. The coils and armature plates are mounted within the differential housing 34 to control the movement of the roll cage 64 with respect to the clutch housing 50.

A first coil 108 is located within a coil insert 110 which is mounted to the right cover plate 52. The coil insert 110 is preferably made from a metallic material, such as steel or powdered metal, and is press fit or similarly attached to the housing. The first coil 108 is preferably annular in shape with a central axis coincident with the axis of rotation of the roll cage 64. The first coil 108 is preferably a bobbin wound coil which includes a plastic base about which the coil is wound. Suitable coils for use in the present invention are well known to those skilled in the electric clutch art. One satisfactory coil is disclosed in U.S. Pat. No. 5,036,939, which is incorporated by reference herein in its entirety. Other suitable coils are available from Endicot Coil Co., Inc. Endicot, N.Y. The first coil 108 is bonded or otherwise attached to the coil insert 110.

A first armature plate 112 is located between the first coil 108 and the roll cage 64. The first armature plate 112 is preferably annular in shape and is free to rotate with respect to the first coil 108 when the coil is not energized. The first armature plate 112 includes at least one and, more preferably at least three tangs or fingers 114 which protrude from the armature plate 112 toward the roll cage 64. The tangs 114 engage with slots 116 formed in the roll cage 64. The first armature plate 112 is locked to the roll cage 64 when the tangs 114 are engaged with the slots 116. Hence, when the first coil 108 is not energized, the first armature plate 112 rotates with the roll cage 64. The first armature plate 112 is preferably made from steel material.

When the first coil 108 is energized, an electromagnetic field is generated between the first coil 108 and the first armature plate 112 attracting the first armature plate 112 to the first coil 108 causing it to drag. Since the first armature plate 112 is engaged with the roll cage 64, the dragging of the first armature plate 112 causes the roll cage 64 to also drag or retard. In an alternate embodiment (not shown), the tangs 114 on the armature plate 112 do not engage with slots 116 formed in the roll cage 64. Instead, the tangs 114 engage with protrusions formed on the roll cage 64 when the first coil 108 is energized.

Figure 4:
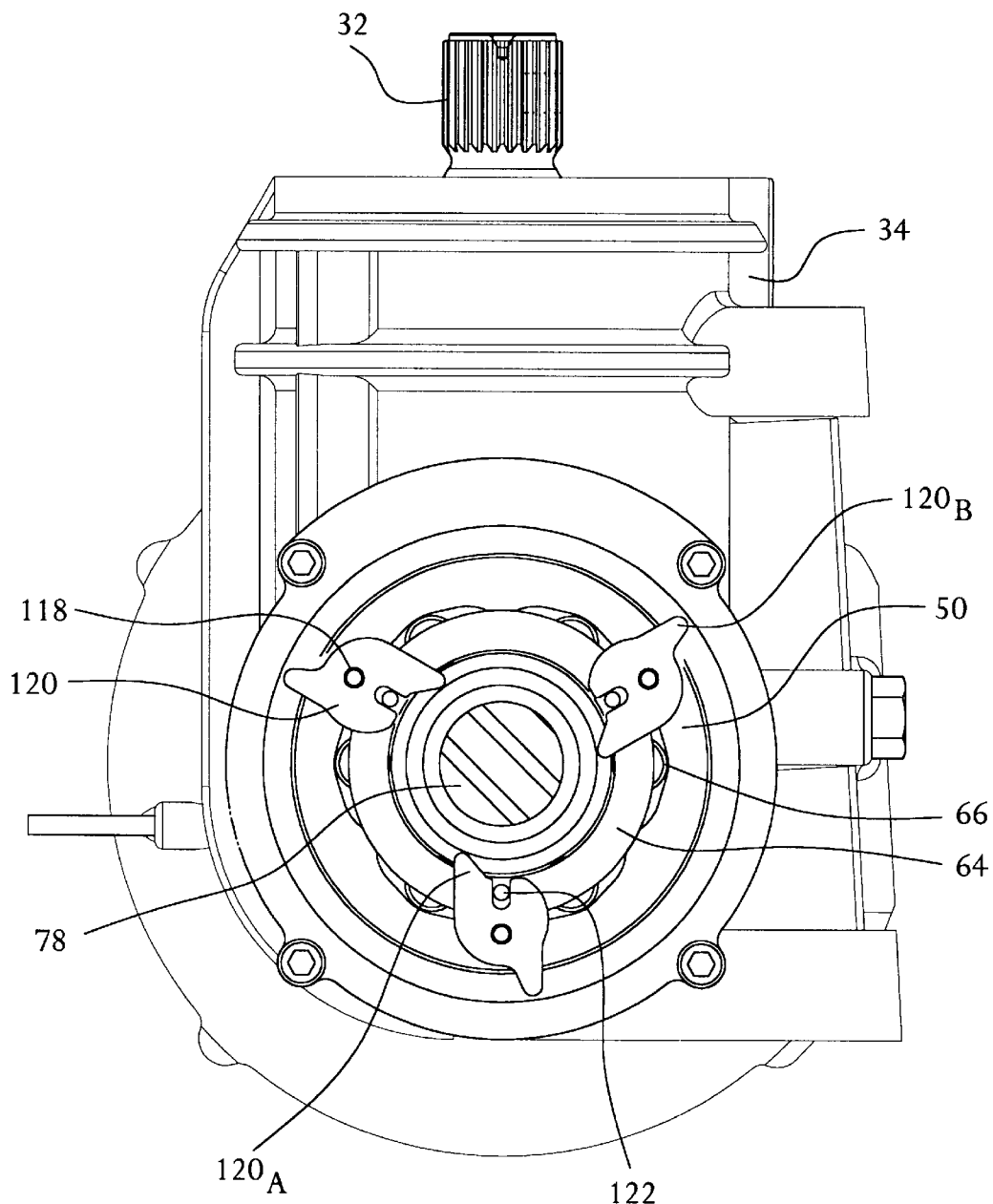
FIG. 4 is a cross-sectional view of the bi-directional overrunning clutch taken along lines 4—4 in FIG. 3.
Figure 5:
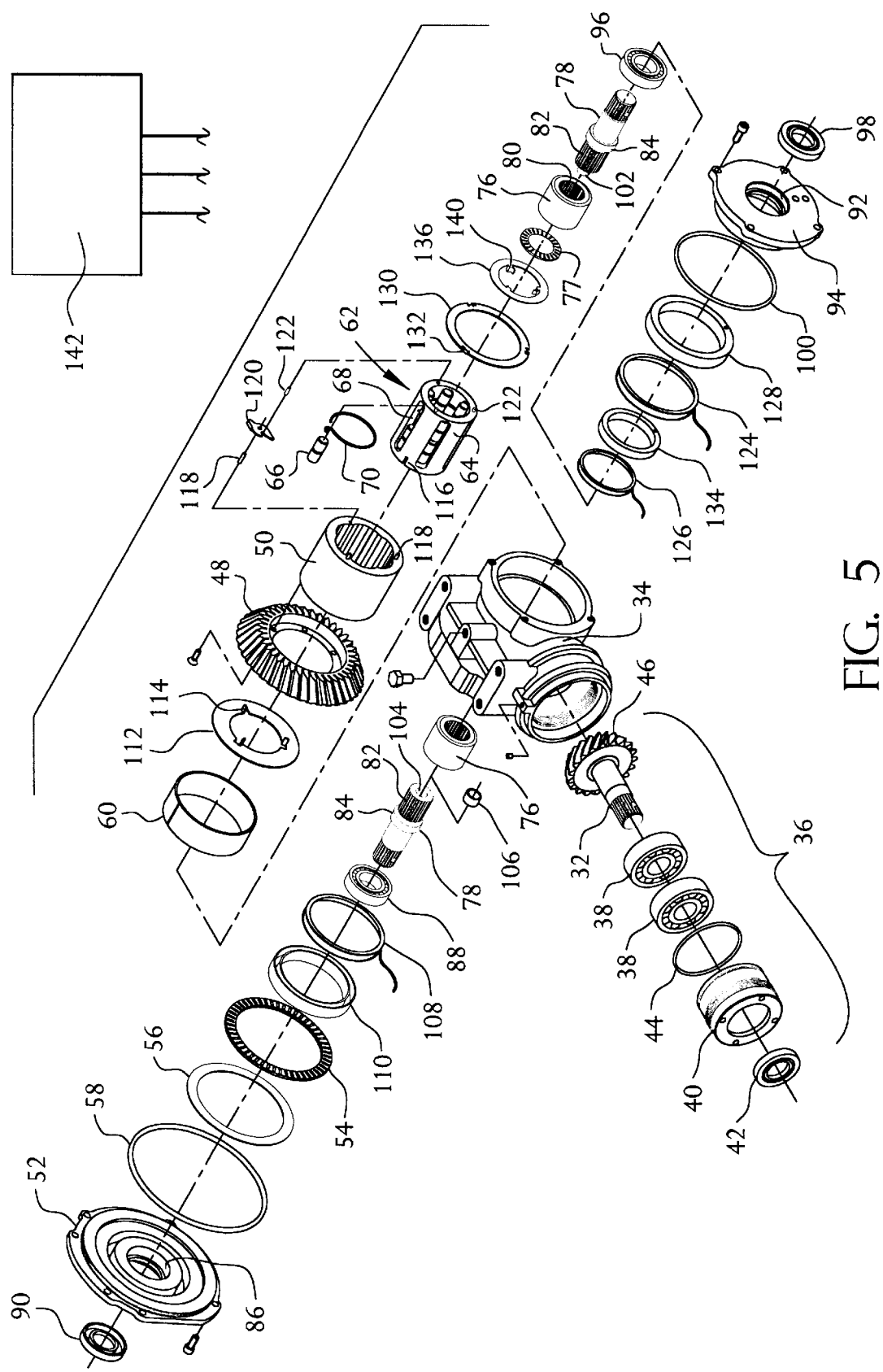
FIG. 5 is an exploded view of the bi-directional overrunning clutch shown in FIGS. 2–4.

Referring to FIGS. 4 and 5, the left side of the clutch housing 50 is shown with a plurality of dowel pins 118 extending outward from the clutch housing 50. A toggle lever 120 is pivotally mounted to each dowel pin 118. Each toggle lever 120 includes a fork at a radially inward end $120_A$ that is designed to engage with a cage pin 122 mounted on the roll cage 64. Pivoting of the toggle levers 120 about the dowel pins 118 causes the forked ends $120_A$ to urge the roll cage 64 to move (i.e., advance or retard) with respect to the clutch housing 50. As such, the engagement and disengagement of the rolls 66 can be controlled by manipulating the toggle levers 120. The radially outward end of each toggle lever 120 preferably includes an outer projection $120_B$ as shown in the figure. The toggle levers 120 are preferably made from steel material and have a stepped thickness that varies from approximately ³⁄₁₆th inch to ¹⁄₁₆th inch. The dowel pins 118 are preferably made from steel material. The cage pins 122 are also preferably made from steel material.

In order to control the pivoting of the toggle levers 120, the present invention incorporates second and third coils 124, 126 as shown in FIGS. 4 and 5. The second coil 124 is mounted within a second coil insert 128 which, in turn, is mounted to the left cover plate 94. The second coil 124 preferably has an annular shape and is mounted to the left cover plate 94 on a central axis which is coincident with the axis of rotation of the clutch housing 50. A second armature plate 130 is located between the second coil 124 and the toggle levers 120. The second armature plate 130 is preferably annular in shape and has a plurality of tangs 132 formed thereon that extend toward the toggle levers 120. The tangs 132 are designed to contact or engage with the outer projections $120_B$ on the toggle levers 120. When the second coil 124 is energized, a magnetic field is generated that inhibits or limits the rotation of the second armature plate 130 (i.e., causing it to drag). As the clutch housing 50 continues to rotate, the tangs 132 on the second armature plate 130 contact the outer projections $120_B$ on the toggle levers 120 urging the toggle levers 120 to pivot about the dowel pins 118. This causes the forked ends $120_A$ of the toggle levers 120 to advance the roll cage 64. As will be discussed in more detail below, the advancement of the roll cage 64 causes the rolls 66 to wedge between the tapered portions $50_T$ of the cam surface and the races 76. The second and third coils 124, 126 are preferably similar to the first coil 108, and the second and third coil inserts 128, 134 are preferably similar to the first coil insert 110.

Similar to the second coil 124, the third coil 126 is mounted within a third coil insert 134 which is concentrically disposed within the second coil insert 128 and mounted to the left cover plate 94. The third coil 126 is preferably annular in shape with a central axis that is coincident with the axis of rotation of the clutch housing 50. A third armature plate 136 is located between the third coil 126 and the toggle levers 120, and is substantially concentric with the second armature plate 130. The third armature plate 136 preferably has a plurality of tangs 140 formed thereon that extend toward the toggle levers 120 and are configured to contact or engage with a portion of the forked ends $120_A$ of the toggle levers 120. When the third coil 126 is energized, a magnetic field is generated that inhibits or limits rotation of the third armature plate 136. As the clutch housing 34 continues to rotate, the tangs 140 on the third armature plate 136 contact the forked ends of the toggle levers 120 causing the toggle levers 120 to pivot about the dowel pins 118 in a direction opposite from the direction of pivoting caused by the second coil 124. The pivoting of the toggle levers 120 result in the roll cage 64 moving in the opposite direction from the direction of rotation of the clutch housing 50.

The coils 108, 124, 126 are connected to a electronic control system, such as a signal processor for controlling the energizing of the coils. (The electronic control system is generally identified by the numeral 142 in FIG. 5.)

Figure 6A:
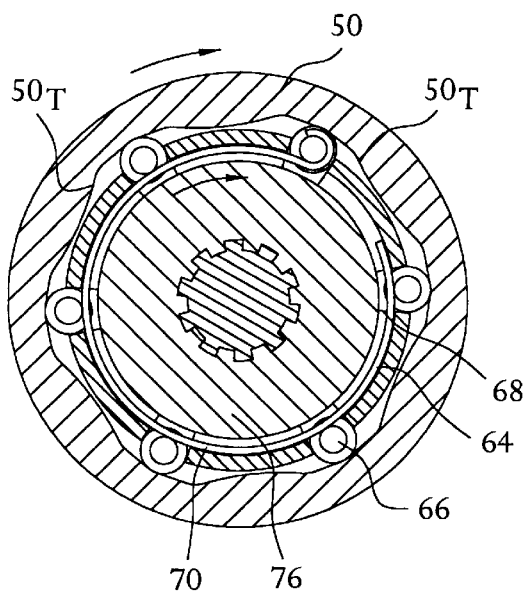
FIG. 6A is a schematic cross-sectional view of a roll cage in a non-activated position.
Figure 6B:
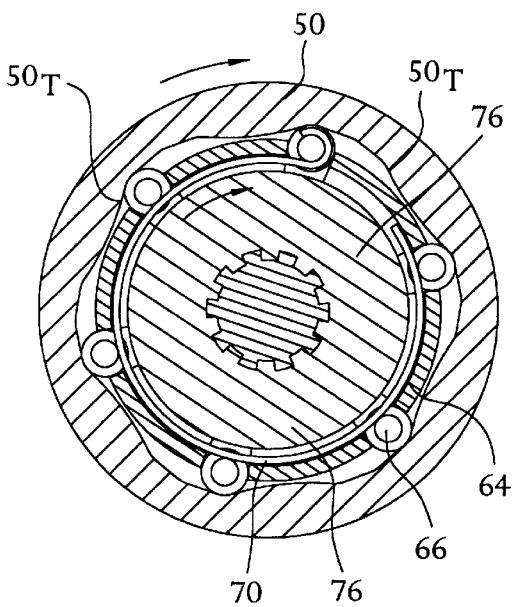
FIG. 6B is a schematic cross-sectional view of the roll cage in a first position.

The operation of the bi-directional overrunning clutch will now be discussed. Under normal operation (two-wheel drive mode), the electronic control system 142 does not send any signals to energize the coils. Accordingly, the vehicle is propelled by the primary drive shaft 14 and primary driven shafts 18, 20. The secondary drive shaft 24 rotates the pinion input shaft 32 which drives the ring gear 48. The ring gear 48 rotates the clutch housing 50 within the differential housing 34. Since the coils are not energized, the springs 70 maintain the roll cage 64 in a relatively central or unengaged position (non-activated position). This position is best illustrated in FIG. 6A. In this position, the rolls 66 are not wedged between the races 76 and the tapered portion $50_T$ of the cam surface of the clutch housing 50 and, therefore, there is no driving engagement between the clutch housing 50 and the races 76. Instead, the rolls 66 and roll cage 64 rotate with the clutch housing 50, independent from the output shafts 78. In this mode of operation, the secondary driven shafts 26, 28 do not drive the wheels but, instead, are driven by the wheels 30.

When it is desired to operate the vehicle such that four wheel drive is available when needed (four-wheel drive capability mode), the electronic control system 142 is activated. Preferably, the activation is provided by manually actuating a button on the vehicle console, although the system can be automatically activated if desired. The electronic control system 142 sends a signal to energize the first coil 108. (The second coil 124 and third coil 126 are not energized in this mode of operation.) The energizing of the first coil 108 creates an electromagnetic field between the first coil 108 and the first armature plate 112. The electromagnetic field causes the first armature plate 112 to drag or slow in speed. Since the first armature plate 112 is engaged to the roll cage 64 by the tangs 114, the electromagnetic field causes the roll cage 64 to slow with respect to the clutch housing 50 into a first position. In this position (shown in FIG. 6B), the rolls 66 are located near to but not wedged between the tapered portion $50_T$ of the cam surface and the races 76. Instead, the difference in rotational speed between the secondary drive shaft 24 and the output shafts 78 maintains the rolls 66 in an overrunning mode. As such, the vehicle continues to operate in two-wheel drive (i.e., driven by the primary drive shaft 14).

Figure 6C:
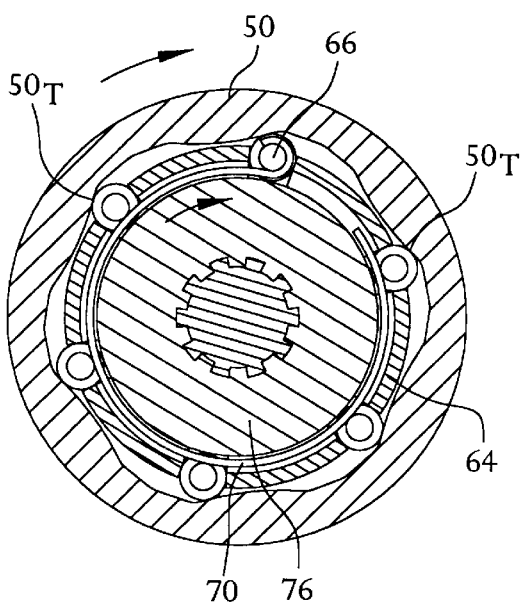
FIG. 6C is a schematic cross-sectional view of the roll cage in an engaged position wherein the pinion input shaft drives the output shafts.

When the wheels 22 driven by the primary drive shaft 14 begin to slip, the rotational speed of the secondary drive shaft 24 and the output shafts 78 begin to equalize relative to the ground, since ground speed controls four-wheel drive and overrunning engagement. As such, the clutch housing 50 starts to rotate faster than the output shafts 78 and races 76. This change in relative speed between these components causes the rolls 66 to wedge between the races 76 and the tapered portion $50_T$ of the cam surface (as shown in FIG. 6C). As a result, torque is transmitted from the clutch housing 50 to the races 76 and the vehicle is now operating in four-wheel drive (i.e., the primary driven shafts 18, 20 and secondary driven shaft 26, 28 are driving the wheels 22, 30). The drive system will stay in four-wheel drive until the wheels 22 on the primary drive shaft 14 stop slipping, at which point the output shaft 78 once again overruns the clutch housing 50 and rolls 66 disengage. The ability of the present invention to engage and disengage the secondary driven shafts when needed allows the system to provide immediate four-wheel drive capability in both forward and rear directions.

Another feature of the bi-directional overrunning clutch 10 according to the present invention is that, even when the vehicle is operating in four-wheel drive capability mode, i.e., when torque is transmitted to the secondary driven shafts 26, 28, the sets of rolls 66 can independently disengage (overrun) from the clutch housing 50 when needed, such as when the vehicle enters into a turn and the wheel on one secondary driven shaft 26 rotates at a different speed than the wheel on the other secondary driven shaft 28. As such, the overrunning clutch 10 provides the drive system with the advantages of an open differential in cornering without traction loss, and the advantages of a locking differential when in four-wheel drive without the disadvantages of understeering and tire scuffing when cornering.

The present invention also provides engine braking capability (backdriving mode) for use when driving the vehicle down steep inclines. In the backdriving mode, the secondary driven shafts 26, 28 are engaged with the secondary drive shaft 24 and actually drive the secondary drive shaft 24. This is important since the front wheels generally have better traction than the rear wheels when the vehicle is descending down a steep slope in a forward direction. The present invention takes advantage of this occurrence and engages the front wheels (via the secondary driven shafts 26, 28 and output shafts 78) with the secondary drive shaft 24 (via the clutch housing 50 and pinion input shaft 32) such that front wheels control the rotation of the secondary drive shaft 24. This produces engine braking, thereby assisting in slowing down the vehicle.

Figure 6D:
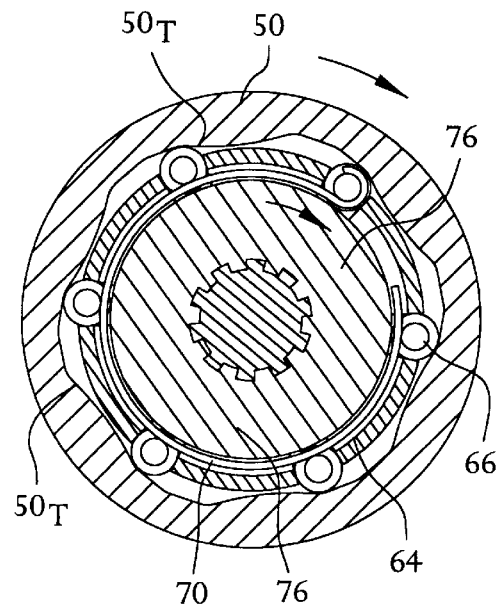
FIG. 6D is a schematic cross-sectional view of the roll cage in a second position wherein the output shafts drive the pinion input shaft.

The backdriving mode is controlled either by a traction sensor (not shown) which sends a signal to the electronic control system 142, or manually engaged by the operator of the vehicle depressing a button (not shown) in the vehicle which sends a signal to the electronic control system 142. The electronic control system 142 then energizes the second coil 124. (The first and third coils 108, 126 are not energized in this mode.) This creates a magnetic field that causes the second armature plate 130 to slow or drag. The tangs 132 on the second armature plate 130 contact the outer projections $120_B$ on the toggle levers 120 as the clutch housing 50 rotates causing the toggle levers 120 to pivot about the dowel pins 118. As the toggle levers 120 pivot, the forked ends $120_A$ of the toggle lever 120 urge the roll cage 64 to advance. This results in the rolls 66 becoming wedged between the races 76 and the tapered portion $50_T$ of the cam surface on the clutch housing 50 (as shown in FIG. 6D). As such, the wheels 30 on the secondary driven shafts 26, 28 are directly connected to the secondary drive shaft 24 and become the input to the gear box locking the entire gear train together. In this mode, both front wheels are engaged.

When in the backdriving mode, it is necessary to disengage the rolls 66 from between the races 76 and the tapered portions $50_T$ of the cam surface when the vehicle is no longer descending the hill. In order to accomplish the disengagement, the electronic control system 142 de-energizes the second coil 124 while energizing the first coil 108. The electromagnetic field generated by the first coil 108 inhibits or hinders the rotation of the first armature plate 112. Since the tangs 114 on the first armature plate 112 are engaged with the slots 116 in the roll cage 64, energizing the first coil causes the rolls 66 to disengage from between the races 76 and the tapered portions $50_T$ of the cam surface.

It is contemplated that when in the backdriving mode, situations may arise where the electromagnetic field produced by the first coil 108 may not be sufficient to disengage the rolls 66 from between the races 76 and the tapered portions $50_T$ of the cam surface. In order to assist in disengagement, the electronic control system 142 also energizes the third coil 126. This causes an electromagnetic field to form which inhibits or limits the rotation of the third armature plate 136. The tangs 140 on the third armature plate 136 contact the forked end $120_A$ of the toggle lever 120 providing additional leverage to pivot the toggle lever 120 around the dowel pin 118. Depending on the configuration of the system, it may be desirable to add a fourth coil and a second toggle system to the right side of the clutch housing 50 adjacent to the first coil 108 to provide additional release leverage.

While one preferred embodiment of the invention has been described with coils and armature plates as the roll cage adjustment devices, those skilled in the art, in light of the teachings provided herein, would understand how to modify the invention to incorporate other mechanical, electrical, hydraulic or pneumatic devices in place of the coils and or armature plates.

It is also contemplated that the cam surface need not be formed on the clutch housing but, instead, can be formed on the races. Also, the roller clutch described above can be easily modified to use sprags instead of rolls. A person skilled in the art could readily make these substitutions in light of the above teachings.

Figure 7:
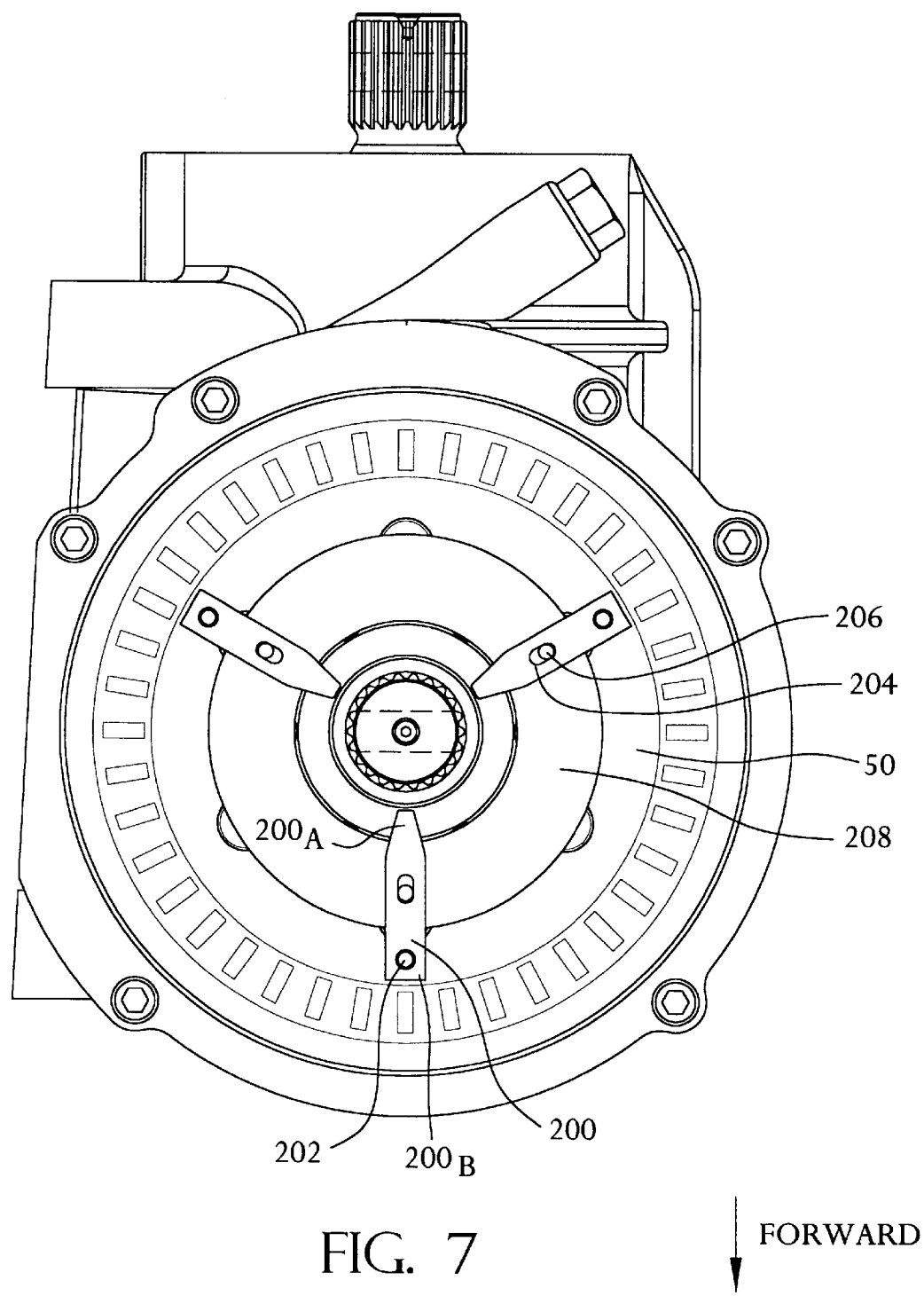
FIG. 7 is a cross-sectional view of a second embodiment of the bi-directional overrunning clutch showing use of toggle levers for controlling the roll cage.
Figure 8:
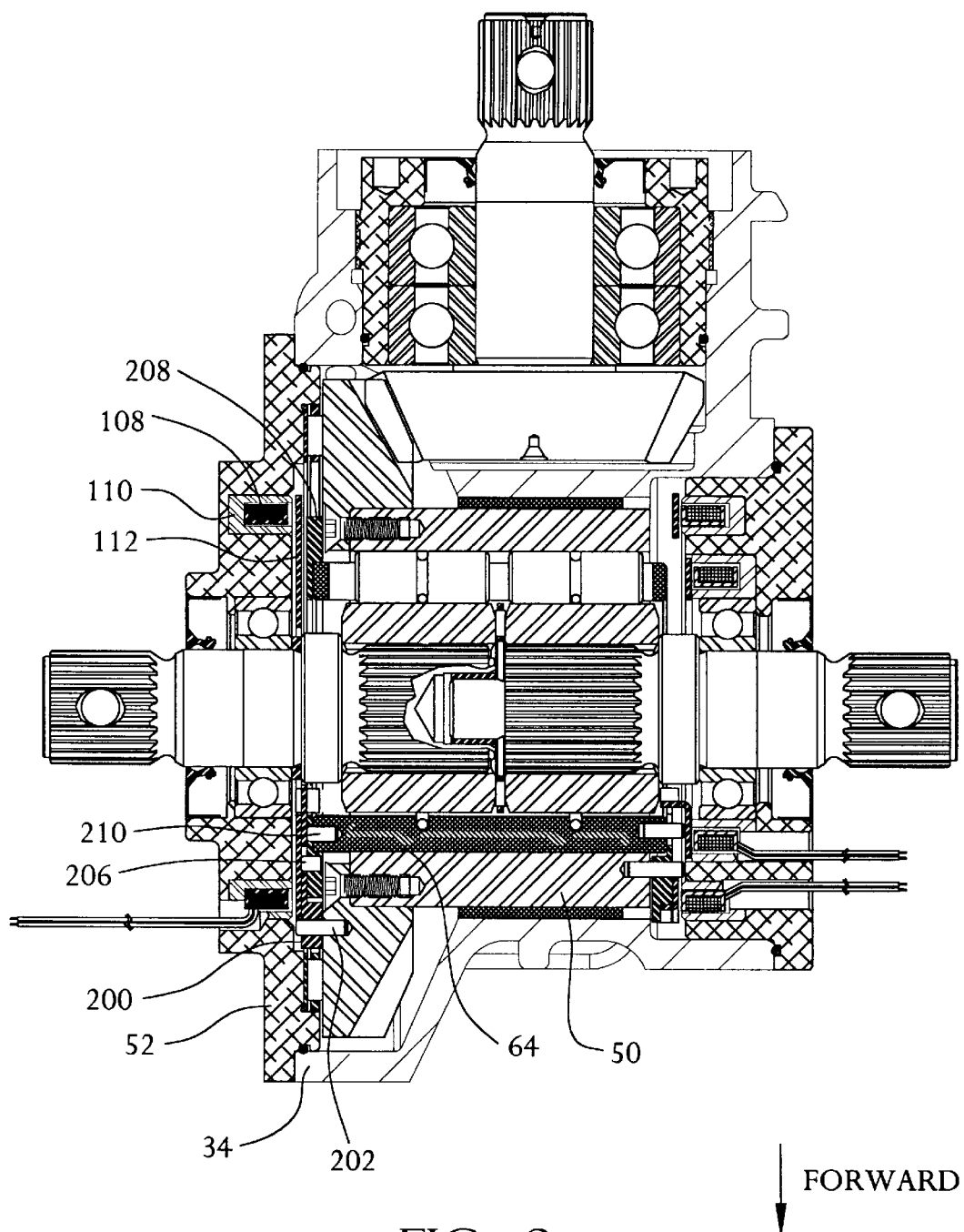
FIG. 8 is a cross-sectional view of the second embodiment of the bi-directional overrunning clutch shown in FIG. 7.

A second embodiment of the invention is shown in FIGS. 7 and 8 wherein a toggle system is incorporated into the right side of the differential housing 34. In this embodiment, the tangs 114 on the first armature plate 112 do not engage with slots 116 formed in the roll cage 64. Instead, at least one, and more preferably three, toggle levers 200 which are pivotally mounted to the clutch housing 50 and engaged with the roll cage 64 for causing the roll cage 64 to advance and retard.

More particularly, each toggle lever 200 has an inner end $200_A$ and an outer end $200_B$. The outer end $200_B$ is pivotally mounted to the clutch housing 50 via a dowel pin 202. The toggle lever 200 also has a slotted opening 204 located approximately midway along its length. The slotted opening 204 is sized to slidingly engage with a protruding pin 206 which extends outward from a flange 208. The flange 208, in turn, is mounted to the roll cage 64 by pins 210. Since the flange 208 is pinned to the roll cage 64, it rotates with it. Furthermore, since the toggle levers 200 are pivotally attached to the clutch housing 50 and slidingly engaged with the protruding pins 206, the roll cage 64 rotates with the clutch housing 50

The first armature plate 112 in this embodiment is configured with its tangs 114 located adjacent to the inner ends $200_A$ of the toggle levers 200, similar to the third armature plate 136.

The operation of this embodiment of the overrunning clutch is similar to the first embodiment described above. When it is desired to place the vehicle in four-wheel drive capability mode, the first coil 108 is activated causing the armature plate 112 to drag. As the armature plate 112 drags its tangs 114 contact the inner ends $200_A$ of the toggle levers 200 causing the levers to pivot about the dowel pins 202. As the toggle levers 200 pivot, they force the protruding pins 206 to retard the roll cage 64. This places the rolls 66 in position to wedge between the clutch housing 50 and the races 76 when the primary drive shaft loses traction. When the first coil 108 is deactivated, the armature plate 112 is once again free to move. The natural motion of the wheels will cause the rolls 66 to disengage from between the clutch housing 50 and the races 76.

As discussed above, the first coil 108 is also activated when it is desired to disengage the rolls 66 after engagement in the back driving mode. In this situation, the activation of the first coil 108 causes the first armature plate 112 to drag. The tangs 114 on the armature plate 112 engage the inner ends $200_A$ of the toggle levers 200 and urge them backward, out of their advanced position. This causes the roll cage 64 to pull the rolls 66 out from engagement between the clutch housing 50 and the races 76.

Other embodiments of the invention are also contemplated, such as mounting the three coils on the same side of the differential housing 34. Hence, the exemplary embodiments described above should not be considered as limiting the full scope of the invention set forth in the claims below.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

We claim:

1. An overrunning clutch for controlling torque transmission between a pinion input shaft and at least one output shaft, the clutch comprising
    a differential housing;
    a pinion input shaft having an end rotatably disposed within the differential housing;
    at least one output shaft having an end rotatably disposed within the differential housing;
    a roller clutch disposed within the differential housing and adapted to control torque transmission between the pinion input shaft and the at least one output shaft, the roller clutch having a first position wherein the roller clutch is positioned to engage the pinion input shaft to the at least one output shaft to permit torque transmission from the pinion input shaft to the at least one output shaft, and a second position wherein the roller clutch engages the pinion input shaft with the at least one output shaft to permit torque transmission from the at least one output shaft to the pinion input shaft;
    a first electromagnetic adjustment device mounted within the differential housing, the first electromagnetic device adapted to place the roller clutch in its first position when energized; and
    a second electromagnetic adjustment device mounted within the differential housing, the second electromagnetic adjustment device adapted to place the roller clutch in its second position when energized.

2. An overrunning clutch according to claim 1 wherein the roller clutch includes a clutch housing and a roll cage, and wherein the first adjustment device includes a first coil which when energized drags the roll cage with respect to the clutch housing.

3. An overrunning clutch according to claim 2 wherein the first electromagnetic device further includes a first armature plate for engaging the roll cage, the energizing of the first coil adapted to cause the armature plate to drag the roll cage.

4. An overrunning clutch according to claim 2 wherein the clutch housing has a plurality of toggle levers pivotally mounted thereon, each toggle lever engaged with the roll cage, the first armature plate adapted to pivot the toggle levers when the first coil is energized to retard the roll cage.

5. An overrunning clutch according to claim 2 wherein the first armature plate includes tangs which engage with slots formed in the roll cage.

6. An overrunning clutch according to claim 2 wherein the second adjustment device includes a second coil which when energized advances the roll cage with respect to the clutch housing.

7. An overrunning clutch according to claim 6 wherein the second electromagnetic device further includes a second armature plate disposed between the coil and the roll cage, the energizing of the second coil adapted to cause the second armature plate to advance the roll cage so that the roller clutch is in its second position.

8. An overrunning clutch according to claim 7 wherein the clutch housing has a plurality of toggle levers pivotally mounted thereon, each toggle lever engaged with the roll cage, the second armature plate adapted to pivot the toggle levers when the second coil is energized to advance the roll cage.

9. An overrunning clutch according to claim 8 wherein the third adjustment device includes a third coil which when energized pivots the toggle levers to retard the roll cage, the retarding of the roll cage moving the roller clutch out of its second position.

10. An overrunning clutch according to claim 1 wherein the overrunning clutch is mounted to a vehicle, the vehicle including a drive shaft and two half shafts, each half shaft having a wheel engaged therewith, the overrunning clutch including two output shafts, each output shaft being rotatably engaged with a half shaft, the pinion input shaft being rotatably engaged with the drive shaft, and an electronic control system for controlling the electromagnetic adjustment devices.

11. An overrunning clutch according to claim 1 further comprising a third electromagnetic adjustment device mounted within the differential housing, the third electromagnetic adjustment device adapted to disengage the roller clutch from its second position when the third electromagnetic device is activated.

12. A bi-directional overrunning clutch for controlling torque transmission between a pinion input shaft and at least one output shaft, the clutch comprising
    a differential housing;
    a pinion input shaft having an end rotatably disposed within the differential housing, the pinion input shaft adapted to rotate an input gear located within the differential housing;
    a ring gear disposed within the housing and rotatably engaged with the input gear;
    a clutch housing attached to the ring gear and rotatably disposed within the differential housing, the clutch housing having a cam surface formed on one side;
    at least one race disposed adjacent to the cam surface and engaged with an output shaft;
    a roll cage disposed between the race and the cam surface, the roll cage including a plurality of slots formed in and spaced circumferentially about the roll cage, each slot having a roll located therein, the roll cage movable with respect to the clutch housing and the at least one race;
    a first armature plate located adjacent to the roll cage;
    a first coil mounted within the differential housing adjacent to the first armature plate, the first coil adapted to produce an electromagnetic field when energized which hinders the rotation of the first armature plate causing the roll cage to drag with respect to the clutch housing;
    a second armature plate located adjacent to the roll cage; and
    a second coil mounted within the differential housing adjacent to the second armature plate, the second coil adapted to produce an electromagnetic field when energized which hinders the rotation of the second armature plate and causes the roll cage to advance with respect to the clutch housing, the advancement of the roll cage with respect to the clutch housing adapted to cause the clutch housing to drivingly engage with the at least one race.

13. A bi-directional overrunning clutch according to claim 12 wherein the dragging of the roll cage with respect to the clutch housing positions the rolls so as to permit rotatable engagement between the at least one race and the clutch housing for transmitting torque from the pinion input shaft to the output shaft when the output shaft rotates at a speed substantially equal to the pinion input shaft.

14. A bi-directional overrunning clutch according to claim 12 further comprising at least one toggle lever pivotally mounted to the clutch housing, the at least one toggle lever engaged with the roll cage such that pivoting of the at least one toggle lever causes the roll cage to move with respect to the clutch housing; and wherein the first armature plate retards the roll cage by urging the at least one toggle lever to pivot.

15. A bi-directional overrunning clutch according to claim 12 wherein the first armature plate includes tangs which engage with slots formed in the roll cage.

16. A bi-directional overrunning clutch according to claim 12 wherein the advancement of the roll cage with respect to the clutch housing rotatably engages the at least one race to the clutch housing such that the output shaft is drivingly engaged with the pinion input shaft.

17. A bi-directional overrunning clutch according to claim 12 further comprising at least one toggle lever pivotally mounted to the clutch housing, the at least one toggle lever engaged with the roll cage such that pivoting of the at least one toggle lever causes the roll cage to move with respect to the clutch housing; and wherein the second armature plate advances the roll cage by urging the at least one toggle lever to pivot.

18. A bi-directional overrunning clutch according to claim 17 wherein the engagement between the at least one toggle lever and the roll cage is provided by at least one pin formed in the roll cage, the at least one toggle lever having an end adapted to engage the pin in the roll cage.

19. A bi-directional overrunning clutch according to claim 18 wherein there are three toggle levers spaced substantially equidistant around the clutch housing, each toggle lever includes an inner forked end which mates with a corresponding pin formed on the roll cage, the pin being capable of moving within the forked end of the toggle lever.

20. A bi-directional overrunning clutch according to claim 12 further comprising a third armature plate located adjacent to the roll cage; and a third coil mounted within the differential housing adjacent to the third armature plate, the third coil adapted to produce an electromagnetic field when energized which hinders the rotation of the third armature plate and causes the roll cage to retard with respect to the clutch housing, the retarding of the roll cage with respect to the clutch housing adapted to disengage the driving engagement between the clutch housing and the at least one race.

21. A bi-directional overrunning clutch according to claim 20 further comprising at least one toggle lever pivotally mounted to the clutch housing, the at least one toggle lever engaged with the roll cage such that pivoting of the at least one toggle lever causes the roll cage to move with respect to the clutch housing; and wherein the third armature plate retards the roll cage by urging the at least one toggle lever to pivot.

22. A bi-directional overrunning clutch according to claim 21 wherein there are a plurality of toggle levers pivotally mounted to the clutch housing, each toggle lever having a first end which is engaged with the roll cage and an outer projection formed on an end of the toggle lever on the opposite side of the pivotal attachment from the first end, and wherein the second armature plate has a plurality of tangs formed thereon which project toward the roll cage, the second armature plate positioned within the differential housing so that the tangs are radially aligned with the outer projections on the toggle levers and adapted to contact the outer projections when the second coil is energized, the contact between the tangs and the outer projections adapted to cause the toggle lever to pivot.

23. A vehicle having four wheel drive capability comprising:
   a transmission;
   a primary drive shaft rotatably driven by the transmission;
   two primary half shafts rotatably engaged with the primary drive shaft, each primary half shaft engaged with a corresponding primary wheel;
   a secondary drive shaft rotatably engaged with the transmission;
   an overrunning clutch assembly engaged to the secondary drive shaft, the overrunning clutch assembly including:
      a differential housing;
      a pinion input shaft rotatably disposed within the differential housing and engaged with the secondary drive shaft;
      a clutch housing disposed within the differential housing and rotatably connected to the pinion input shaft, the clutch housing having an inner surface;
      at least one race disposed adjacent to the inner surface of the clutch housing, the at least one race being engaged with an output shaft;
      a cage disposed between the at least one race and the inner surface of the clutch housing, the cage having a plurality of slots formed in and spaced circumferentially about the cage, each slot having a movable member located therein, the cage being adjustable with respect to the clutch housing and the at least one race;
      a first armature plate located adjacent to and adapted to engage with the cage;
      a first coil mounted within the differential housing adjacent to the first armature plate, the first coil adapted to produce an electromagnetic field when energized which hinders the rotation of the first armature plate causing the cage to move to a first position with respect to the clutch housing, the first position of the cage locating the movable members so as to wedge between the inner surface and the at least one race when one of the primary wheels loses traction;
      a second armature plate located adjacent to the cage;
      a second coil mounted within the differential housing adjacent to the second armature plate, the second coil adapted to produce an electromagnetic field when energized which hinders the rotation of the second armature plate and causes the cage to move to a second position with respect to the clutch housing, the second position of the cage adapted to wedge the movable members between the inner surface and the at least one race; and
      an electronic control system connected to the first and second coils, the electronic control system providing signals for controlling energizing of the first and second coils.

24. A vehicle according to claim 23 wherein the overrunning clutch further includes a third armature plate located adjacent to the cage; and a third coil mounted within the differential housing adjacent to the third armature plate, the third coil adapted to produce an electromagnetic field when energized which hinders the rotation of the third armature plate and causes the cage to move out of the second position and the movable members to disengage from between the inner surface and the at least one race.

25. A vehicle according to claim 23 wherein the electronic control system includes a manually actuated button which when activated results in the energizing of the first coil.

26. An overrunning clutch assembly comprising:

a differential housing;

a pinion input shaft having an end rotatably disposed within the differential housing;

a clutch housing disposed within the differential housing and rotatably connected to the pinion input shaft, the clutch housing having an inner surface;

at least one race disposed adjacent to the inner surface of the clutch housing, the at least one race being engaged with an output shaft;

a cage disposed between the at least one race and the inner surface of the clutch housing, the cage having a plurality of slots formed in and spaced circumferentially about the cage, each slot having a movable member located therein, the cage being adjustable with respect to the clutch housing and the at least one race;

a first armature plate located adjacent to and adapted to engage with the cage;

a first coil mounted within the differential housing adjacent the first armature plate, the first coil adapted to produce an electromagnetic field when activated which hinders the rotation of the first armature plate causing the cage to move to a first position with respect to the clutch housing, the first position of the cage locating the movable members so as to wedge between the inner surface and the at least one race;

a second armature plate located adjacent to the cage; and a second coil mounted within the differential housing adjacent to the second armature plate, the second coil adapted to produce an electromagnetic field when activated which hinders the rotation of the second armature plate and causes the cage to move to a second position with respect to the clutch housing, the second position of the cage adapted to wedge the movable members between the inner surface and the at least one race.

* * * * *